Jan. 24, 1967　　　　　G. G. SIMOR　　　　　3,300,085
DISPENSER FOR FLEXIBLE STRIPS
Filed Oct. 22, 1965　　　　　　　　　　　　3 Sheets-Sheet 1

INVENTOR.
GEORGE G. SIMOR
BY
　Jansewitz & Carr
ATTORNEYS

Jan. 24, 1967   G. G. SIMOR   3,300,085
DISPENSER FOR FLEXIBLE STRIPS
Filed Oct. 22, 1965   3 Sheets-Sheet 2

INVENTOR.
GEORGE G. SIMOR
BY
*Gansowitz & Carr*
ATTORNEYS

Jan. 24, 1967     G. G. SIMOR     3,300,085
DISPENSER FOR FLEXIBLE STRIPS

Filed Oct. 22, 1965     3 Sheets-Sheet 3

INVENTOR.
GEORGE G. SIMOR
BY
*Gurewitz & Carr*
ATTORNEYS

United States Patent Office 3,300,085
Patented Jan. 24, 1967

3,300,085
DISPENSER FOR FLEXIBLE STRIPS
George G. Simor, 4619 August St.,
Los Angeles, Calif. 90008
Filed Oct. 22, 1965, Ser. No. 501,380
12 Claims. (Cl. 221—41)

This invention pertains to a dispensing device of general utility, but especially adapted for individual ejection of thin plastic strips used in the practice of dentistry.

In dental work, thin strips of plastic are used in connection with the filling of teeth. This occurs when a compound is inserted into the cavity in the tooth where it is allowed to harden and form the completed filling. After introducing this material into the cavity, a plastic strip is wrapped around the tooth to hold the compound in place until it sets up to its hard consistency. This provides the filling with a smooth exterior that blends with the tooth contour. After the material for the filling has solidified, the plastic strip is removed and discarded.

The plastic strips for this purpose normally are furnished in a box and merely selected by hand when needed. This is an awkward operation and takes the time of the dentist when he is fully occupied with other matters. The plastic strips, being thin, smoth and uniform, tend to cling together so that it is difficult to select only one of the strips from a stack within the box. Valuable time of the dentist can be lost in this manner, and it is an annoyance to have to fumble for the individual strips in this manner.

There have been several past proposals for dispensing devices for strip or sheet material of various kinds. However, none of these prior devices will operate satisfactorily for the plastic strips used in dentistry. The problems center around the flexible nature of the strips, their smoothness and the minute thickness, which is typically only .002 inch for these strips. Also, considerable static electricity is present with these strips, resulting in an attractive force between adjacent strips that increases the difficulty of separation. A conventional dispenser construction either will not dispense such strips at all or will not eject strips one at a time.

The present invention solves these problems by a mechanism that imparts predetermined bends to the strips at the time of ejection. The stack of strips is bent first one way and then the other about the longitudinal axis. This helps separate the top strip from the stack of strips within the housing. Also, the bend about a longitudinal axis that is given the top strip that is being ejected provides it with sufficient rigidity so that it can be forced out of the housing. Each strip exits through an arcuate opening dimensioned to allow passage of only one strip so that there is assurance of ejection of the strips by a simple thumb push action. Typically, it is manufactured of plastic, providing a unit that is both attractive and of particularly low cost. The plastic unit provides a housing that retains all unused strips and protects them until they are needed.

An object of this invention is to provide an improved dispenser for strip material.

Another object of this invention is to provide a dispenser that will eject thin strips one at a time.

A further object of this invention is to provide a strip dispenser that can be manufactured economically on a mass production basis, while at the same time it is an attractive and reliable device.

Yet another object of this invention is to provide a strip dispenser that will retain and protect a quantity of strips ready for ejection.

These and other objects will become apparent from the following detailed description taken in connection with the accompanying drawing in which.

Figure 16:
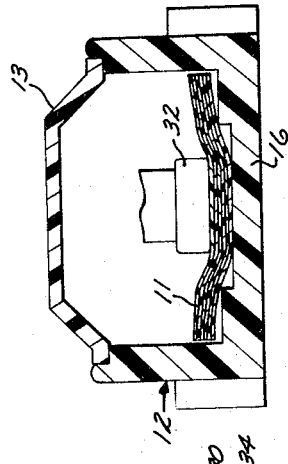
FIGURE 16 is a transverse sectional view taken along line 16—16 of FIGURE 15.
Figure 1:
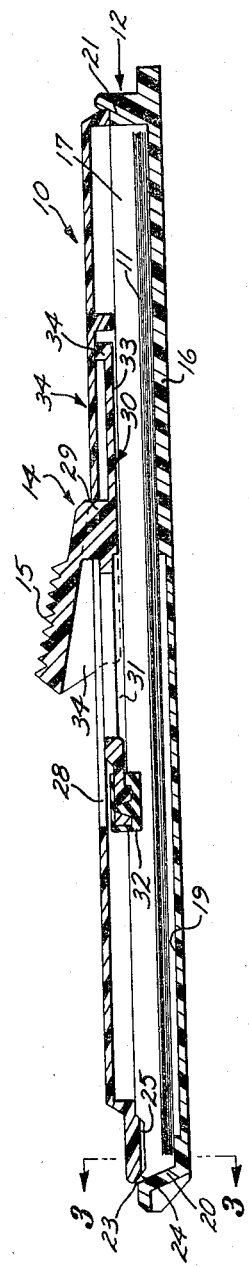
FIGURE 1 is a longitudinal sectional view of the strip dispenser of this invention.

The strip dispenser of this invention includes a housing 10 adapted to receive and retain a quantity of thin plastic strips 11. The housing is made in two parts including a bottom channel portion 12 and a top lid 13. A slider 14 has a thumbpiece 15 exteriorly of the lid 13 and is used in ejecting the plastic strips 11 from the housing 10. In other words, plastic strips are dispensed by pushing down and forwardly on the thumbpiece 15, advancing it to the left as the device is illustrated in FIGURE 1.

The channel section 12 includes a bottom wall 16 and upstanding side walls 17 and 18. The length and width of the channel 12 is such that a quantity of the strips 11 fits snugly within it. A longitudinal rectangular recess 19 is provided in the upper surface of the bottom wall 16 of the channel 12. This positions the recess beneath the slider 14 and relatively adjacent the end wall 20 of the channel 12.

Figure 2:
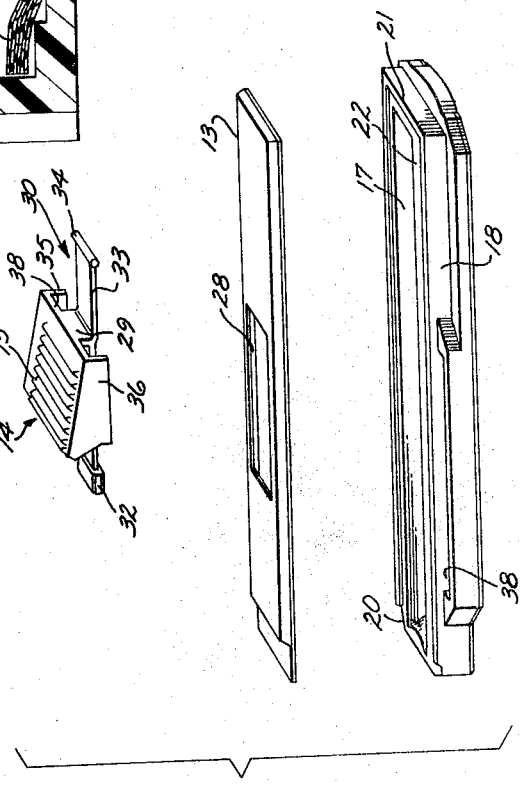
FIGURE 2 is an exploded perspective view of the strip dispenser.
Figure 3:
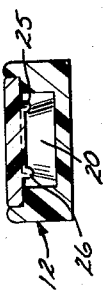
FIGURE 3 is an enlarged sectional view taken along line 3—3 of FIGURE 1, illustrating the construction of the housing at the end through which the strips are ejected.
Figure 15:
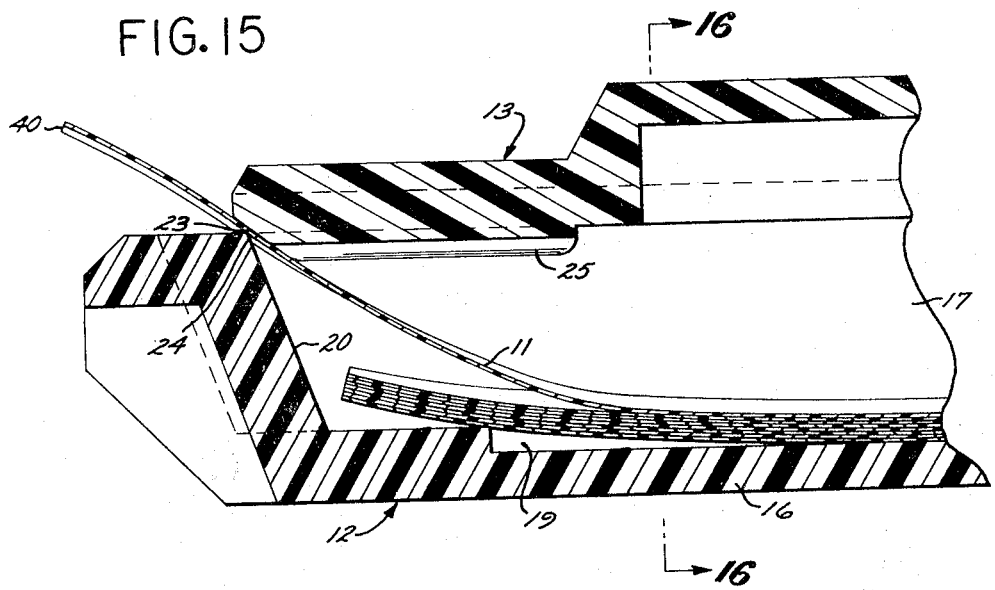
FIGURE 15 is an enlarged fragmentary longitudinal sectional view of the end of the strip dispenser as a strip is being ejected.
Figure 4:
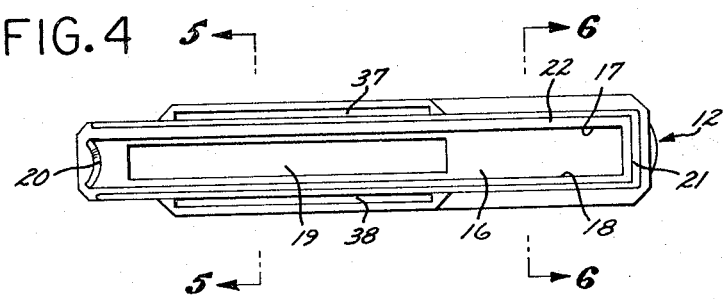
FIGURE 4 is a top plan view of the bottom channel portion of the housing, separated from the remaining elements of the invention.
Figure 5:
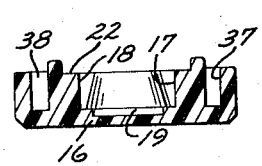
FIGURE 5 is an enlarged transverse sectional view taken along line 5—5 of FIGURE 4.
Figure 6:
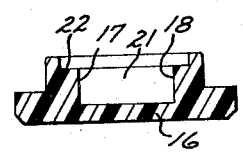
FIGURE 6 is an enlarged transverse sectional view taken along line 6—6 of FIGURE 4.
Figure 7:
FIGURE 7 is a top plan view of the lid portion of the housing separated from the remaining components of the strip dispenser.
Figure 8:
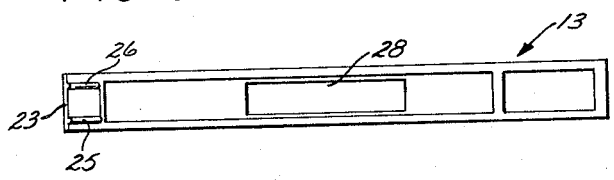
FIGURE 8 is a bottom plan view of the lid.
Figure 9:
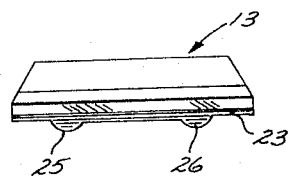
FIGURE 9 is an enlarged front end elevational view of the lid.
Figure 10:
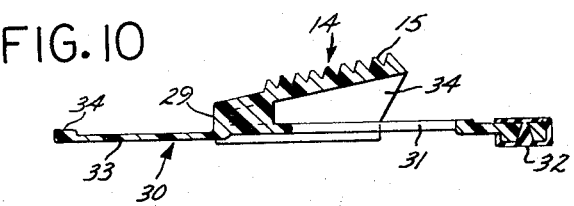
FIGURE 10 is a longitudinal sectional view of the slider separated from the other elements of the invention.
Figure 12:
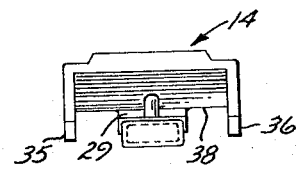
FIGURE 12 is a front end elevational view of the slider.
Figure 11:
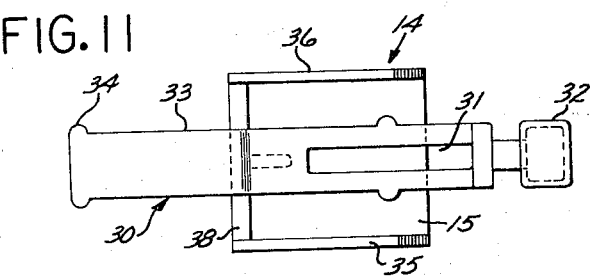
FIGURE 11 is a bottom plan view of the slider.
Figure 14:
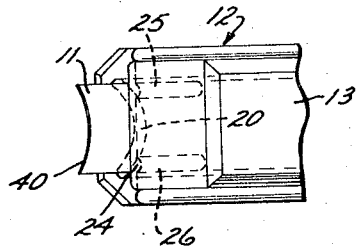
FIGURE 14 is a fragmentary top plan view of the strip dispenser as a strip is being ejected.

The end walls 20 and 21 of the channel 12 are spaced apart a distance slightly greater than the length of the plastic strips 11. The end wall 21 provides a flat surface perpendicular to the bottom wall 16. However, the wall 20 is arcuate, as seen in FIGURES 2, 3 and 4, presenting a convex surface that may be defined by a cylindrical segment. The wall 20 also is at an obtuse angle with respect to the bottom wall 16, thereby providing a ramp that slopes upwardly and away from the bottom wall 16.

The lid 13 fits over the channel 12 and rests on a ledge 22 on the inner periphery of the upper sections of the walls 17, 18 and 21. The lid is secured to the bottom channel 12 at this location. The end 23 of the lid is adjacent the bottom channel end wall 20, and provides an edge surface that slopes at a shallower angle than that of the surface 20, being closely spaced from the upper edge of the sloping wall 20. This provides a narrow outlet opening 24 for the housing 10.

A pair of ridges 25 and 26 is provided on the bottom of the lid 13 adjacent the opening 24. These ridges are rounded convexly and extend longitudinally of the lid 13, with their ends forming a continuation of the lid edge surface 23. The ridges 25 and 26 are parallel on either side of the longitudinal axis of the housing.

A rectangular opening 28 is provided in the lid 13 through which extends a post 29 of the slider 14. Connected to the inner end of the post portion 29 of the slider 14, on the underside of the lid 13, is an elongated flexible element 30. One portion 31 of the member 30 extends forwardly of the post 29 toward the outlet opening 24, and at its distal end is provided with a friction element 32, which may be a small piece of rubber. The opposite end 33 of the element 30 extends beneath the lid 13, having a transverse ridge 34 at its distal end for engagement with the lid.

As a result of this construction, it may be seen that the thumbpiece may be pushed downwardly to bring the friction element 32 into engagement with the topmost thin plastic strip 11 within the housing 10. As this downward movement takes place, the end 34 of the rearward section 33 of the slider remains in engagement with the undersurface of the lid. At this time the element 33 bends so that the engagement of the friction piece 32 with the top plastic strip may take place at the opposite end of the slider. The forward end portion 31 also flexes as the friction piece 32 is brought into engagement with the uppermost strip 11 in the housing.

The flexibility of the forward section 31 of the portion 30 of the slider 14 controls the amount of force imposed upon the stack of strips in the housing. When the thumbpiece 15 is pushed flat against the top of the lid 13, the section 31 of the slider will be bent a limited amount. This, in turn, governs the compressive force on the stack of strips. This force is made such that the friction element 32 can cause the top strip to move with it, while not creating such friction between the strips as would prevent the upper strip from sliding. The force on the stack of strips will remain substantially unchanged during ejection of the strips in the housing because the bending of the section 31 will be approximately the same during each stroke of the slider.

The slider 14 may be moved forwardly until the post section 29 engages the forward edge of the opening 28 which limits the stroke of the slider 14. The rearward end 34 of the inner slider portion 30 projects laterally to engage the lid on either side of the opening 28 as the slider is moved forwardly. This holds the end 34 within the housing 10 so that it does not escape through the opening 28.

The thumbpiece 15 is U-shaped in cross section, having depending side flanges 35 and 36. These extend into slots 37 and 38 running longitudinally of the channel 12 outside of the walls 17 and 18. This assists in guiding the thumbpiece during its movement. The slots 37 and 38 provide a clearance beneath the flanges 35 and 36 to allow the thumbpiece to be pushed downwardly to bring the friction element 32 into engagement with the top strip 11. Upon the downward movement of the thumbpiece 15, it pivots about the rear edge 39 of the thumbpiece laterally outwardly of the post 29.

Figure 13:
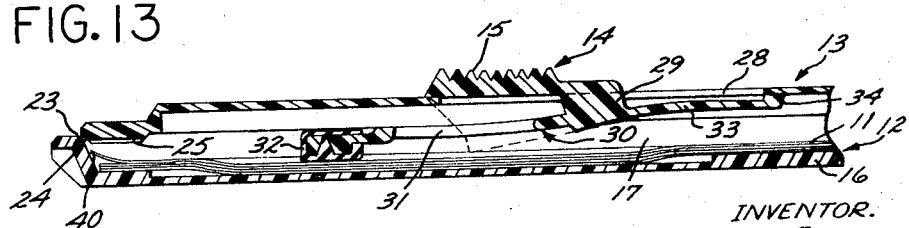
FIGURE 13 is a longitudinal sectional view of the strip dispenser during the stroke of the slider ejecting a strip.

When the thumbpiece 15 is pushed downwardly, and the end 32 is brought into engagement with the stack of plastic strips, the strips are deflected as seen in FIGURE 13. In other words, they are bent about a longitudinal axis as they are moved down into the recess 19 in the bottom wall 16 of the channel 12. The recess 19 is narrower than the strips 11, so that the side portions of the strips are supported by the surface of the bottom wall 16 on either side of the recess. As viewed from above, the strips are thereby given a concave curvature. This bending of the top strip gives it a rigidity enabling it to be advanced toward the end wall 20 by the push of the slider 14 as the slider is moved forwardly through its stroke.

As the top strip 11 is advanced by the slider 14, its end 40 soon contacts the upwardly sloping end surface 20. In view of the inclined nature of this wall, the end 40 rides up the ramp that the wall provides. At the top edge of the surface 20, the strip enters the outet opening 24. As this occurs, the strip is confined between the convex wall 20 and the edge 23 of the lid 13. The edge, of course, incudes the protuberances provided by the ridges 25 and 26 which are located on either side of the londitudinal axis of the housing. The ridges, together with the convex end wall 20, cooperate to impart a bend to the end of the strip 11 as it is advanced through the opening 24. Thus, the strip is given a bend about its longitudinal axis so that it becomes arcuate transversely in the direction opposite from the bend previously imparted to it. Consequenty, the strip retains its rigidity so that, despite the fact that the friction member 32 is pushing from some distance away, it is possible for this thin strip to be moved out through the opening 24. The effect of reversing the bend of the top strip as it is ejected is to assure separation of it from the stack of strips beneath. The latter retains the convex curvature so that the oppositely bent top strip will separate cleanly.

In order to give complete assurance that only one strip will be ejected at a time, the clearance provided at the opening 24 is dimensioned so that it is thick enough to allow one of the strips to pass through, but not thick enough to allow two strips at once. Also, as the top strip moves out through the opening 24, it is bent about the transverse axis as it is held elevated above the remaining strips in the housing by the wall 20. This, too, acts to separate the top strip from the next one. The inner portion of the strip being ejected produces a reaction against the stack of strips because of the latter bend, holding those strips down while the upper strip exits.

Therefore, in using the device, the slider 14 merely is advanced through a stroke by pushing downwardly and forwardly on the thumbpiece 15. As this occurs, the friction element 32 at the forward end of the slider contacts the top strip, flexing the stack of strips into the recess 19 as described above. The top strip is slid off the remainder of the pile to climb up the inclined end wall 20 to the outlet opening 24. At this point, the reverse transverse curvature is given to the top strip so that it will separate itself cleanly from the remaining strips, while retaining its rigidity so that it can be pushed out of the housing, despite the fact that it is confined to a small opening at the housing exit. The rigidity of the strip resulting from the transverse curvature assures that it can move out of the housing from the push from within. One stroke of the slider will advance the strip a sufficient distance from the end of the housing so that it conveniently is grasped for use.

Thus, the strips may be ejected from the housing one at a time whenever desired by the simple movement of the thumbpiece 15. The remaining strips are retained in the housing fully protected by it. The device will eject the strips one at a time throughout the quantity that is introduced into the housing for this purpose. Each strip down to the last one will be forced out of the housing in the ejecting action. The device of this invention is foolproof in its operation and reliably will eject the strips one at a time as desired. No longer is it necessary to fumble with a pile of associated plastic strips in a box in order to select a strip for completing a filling of a tooth or for any other desired purpose.

The foregoing detailed description is to be clearly understood as given by way of illustration and example only, the spirit and scope of this invention being limited solely by the appended claims.

I claim:

1. A dispenser for strip material comprising an elongated housing adapted to receive a plurality of superimposd flexible strips, an actuating member movable toward one end of said housing, said housing having support means opposite said actuating member for supporting said superimposed flexible strips, said support means defining a recess therein, said actuating member being engageable with the uppermost one of said superimposed strips for moving said uppermost strip therewith toward said end of said housing, and deflecting said superimposed strips into said recess for bending said strips to facilitate the separation of said uppermost strip from the remainder of said strips, said housing having an outlet opening at said end, an inclined surface at said end leading to said opening, whereby upon said movement of said actuating member said uppermost strip is brought into engagement with said inclined surface and directed to said opening, and guide means at said opening for imparting an arcuate contour to said uppermost strip at said opening for thereby increasing the rigidity of said uppermost strip.

2. A dispenser for strip material comprising
a housing adapted to receive a plurality of superimposed flexible strips,
said housing having a lower wall for supporting said superimposed strips,
said lower wall having a relatively shallow recess therein,
an actuating member,
said actuating member being movable toward one end of said housing
and simultaneously movable toward said recess in in said lower wall,
for engaging the uppermost one of said superimposed strips and moving said uppermost strip toward said one end of said housing,
and deflecting said superimposed strips into said recess for thereby bending said strips to facilitate the separation of said uppermost strip from the remainder of said strips,
said housing having a relatively narrow opening at said one end for dispensing said uppermost strip upon said movement of said actuating member,
and an inclined surface in said housing at said one end thereof for directing said uppermost strip to said opening.

3. A dispenser for strip material comprising
an elongated housing adapted to receive a plurality of superimposd flexible strips,
and an actuating member, said housing having a wall opposite said actuating member for supporting said superimposed flexible strips, said wall having a recess therein,
said actuating member being movable through a stroke in which said actuating member moves toward one end of said housing,
said actuating member having a friction surface engageable with the uppermost one of said superimposed strips upon said movement of said actuating member through said stroke, for deflecting said superimposed strips into said recess for bending said strips to facilitate the separation of said uppermost one of said strips from the remainder of said strips and moving said uppermost strip with said actuating member,
said housing having an outlet opening at said one end,
and having an inclined arcuate wall at said end extending to said opening,
the end of a strip moved by said actuating member being engageable with said wall for movement along said wall toward said opening,
said housing at said opening including means cooperating with said inclined arcuate wall to impart a transverse curvature to said uppermost strip for thereby increasing the rigidity of said uppermost strip.

4. In combination with at least two strips of flexible material of predetermined thickness, a strip dispensing device comprising
an elongated housing adapted to receive said strips in a superimposed relationship,
and an actuating member,
said actuating member being slidable through a stroke longitudinally of said housing in which said actuating member is moved toward one end of said housing,
said actuating member having a portion exteriorly of said housing manually engageable for imparting said movement to said actuating member,
said actuating member having a portion interiorly of said housing,
said portion interiorly of said housing having a friction surface engageable with the uppermost one of said superimposed strips upon said movement of said actuating member through said stroke for moving said uppermost strip therewith, said housing having a wall opposite said actuating member for supporting said superimposed flexible strips, said wall having a recess therein so that upon said engagement of said friction surface said superimposed strips are deflected into said recess for bending said strips to facilitate separation of said uppermost strip from the remainder of said strips,
said housing having an inclined arcuate surface at said one end thereof,
and being provided with an outlet opening adjacent said surface,
said housing including portions at said opening projecting toward said inclined arcuate surface for cooperating with said inclined arcuate surface to impart a transverse bend to said uppermost strip for thereby increasing the rigidity of said strip to enable said actuating member to eject said end of said strip from said housing,
said opening being of a thickness which is no less than said thickness of said uppermost strip and which is not as great as the combined thicknesses of two of said strips,
for thereby assuring the ejection of a single one of said strips upon said stroke of said actuating member.

5. In combination with at least two strips of flexible material of predetermined thickness, a strip dispensing device comprising
an elongated housing adapted to receive said strips in a superimposed relationship,
said housing having a lower wall supporting said strips,
said lower wall having a recess therein beneath said strips,
said recess being narrower than the width of said strips,
and an actuating member,
said actuating member being slidable through a stroke longitudinally of said housing in which said actuating member is moved toward one end of said housing,
said actuating member having a portion exteriorly of said housing manually engageable for imparting said movement to said actuating member, said actuating member having a portion interiorly of said housing,
said portion interiorly of said housing having a friction surface movable toward said lower wall for engagement with the uppermost one of said superimposed strips,
whereby upon movement of said actuating member through said stroke said uppermost strip is moved therewith,
said friction surface during at least a portion of said stroke being opposed to said recess in said lower wall for forcing said strips into said recess and bending said strips about an axis longitudinally of said strips for imparting rigidity to said uppermost strip,
said housing having an inclined arcuate surface at said one end thereof,
and being provided with an outlet opening adjacent said surface,
said housing including portions at said opening projecting toward said inclined arcuate surface for cooperating with said inclined arcuate surface to impart a transverse bend to said uppermost strip opposite to said previously imparted bend for thereby facilitating separation of said uppermost strip from the other of said strips while retaining the rigidity of said uppermost strip to enable said actuating member to eject said end of said uppermost strip from said housing,
said opening being of a thickness which is no less than said thickness of said uppermost strip and which is not as great as the combined thicknesses of two of said strips,
for thereby assuring the ejection of a single one of said strips upon said stroke of said actuating member.

6. A dispenser for strip material comprising
an elongated housing adapted to receive a plurality of superimposd flexible strips,
and an actuating member,
said housing including an upper wall and including a lower wall,
said lower wall being adapted to support said superimposed strips,
said upper wall having an elongated opening therethrough,
said actuating member including a first portion exteriorly of said housing,
a second portion interiorly of said housing,
and a third portion interconnecting said first and second portions,
said third portion extending through said opening in said upper wall,
said first portion being adapted for manual manipulation for moving said actuating member longitudinally of said housing through a stroke toward one end of said housing,
said second portion of said actuating member including a friction surface at one end thereof,
said friction surface being engageable with the uppermost one of said superimposed strips intermediate the ends thereof upon said movement of said actuating member through said stroke,
said lower wall adjacent said one end of said actuating member being provided with an elongated shallow recess narrower than the width of said lower wall,
whereby upon said engagement of said uppermost strip by said friction surface said superimposed strips are supported on either side of said recess and at the central portion thereof bent transversely into said recess to impart rigidity to said uppermost strip and facilitate separation of said uppermost strip from the remainder of said strips upon being bent transversely in the opposite direction at said end wall,
said housing including an end wall at said one end, said end wall being inclined longitudinally outwardly from a location adjacent said lower wall to a top edge adjacent said upper wall of said housing,
said end wall being convexly arcuate,
said housing having an elongated transverse opening adjacent said top edge of said end wall, said upper wall of said housing including spaced protuberances on either side of the axis thereof projecting toward said arcuate end wall,
whereby when said uppermost strip is engaged by said end of said actuating member said strip is brought into contact with said end wall and directed thereby to said transverse opening and is given a transverse bend by said arcuate end wall and said spaced protuberances,
whereby said uppermost strip is made more rigid and can be ejected from said housing by said actuating member.

7. A dispenser for strip material comprising
an elongated housing adapted to receive a plurality of superimposed flexible strips,
said housing having a bottom wall and a top wall,
said bottom wall being adapted to support said superimposed strips,
said top wall having an elongated aperture therethrough intermediate the ends thereof,
and an actuating member movable through a stroke longitudinally of said housing toward one end thereof,
said actuating member having a first portion exteriorly of said housing,
a second portion interiorly of said housing,
and a third portion extending through said opening in said top wall and interconnecting said first and second portions,
said first portion being inclined from said third portion upwardly away from said top wall and forwardly toward one end of said housing,
said second portion including a forward part extending from said third portion toward said one end of said housing,
and a rearward part extending from said third portion away from said one end of said housing,,
said forward and rearward parts being bendable,
said forward part of said second portion including a friction element at the distal end thereof,
said friction element being engageable with the uppermost one of said superimposed strips upon downward movement of said upwardly inclined first portion of said actuating member,
said rearward part of said second portion of said actuating member being held in engagement with said top wall and caused to bend by such movement of said first portion for thereby permitting said friction member to move downwardly to so engage said uppermost one of said superimposed strips,
said bottom wall of said housing including a recess therein beneath said distal end of said forward part of said second portion of said actuating member, said recess being narrower than said bottom wall, whereby when said distal end is brought into engagement with said uppermost one of said flexible strips a downward force imposed on said strips by said actuating member causes said superimposed strips to be bent transversely in one direction and deflected into said recess in said bottom wall, said one end of said housing having a surface inclined upwardly and longitudinally outwardly from said bottom wall, said inclined surface being convex and having an upper edge, said housing having a transversely extending opening at said upper edge, said top wall having a pair of spaced protuberances disposed one on either side of the longitudinal axis of said housing and adjacent said convex surface for cooperating with said convex surface and imparting a transverse bend in the opposite direction to said uppermost one of said flexible strips when said uppermost one of said flexible strips is moved by said friction element of said actuating member along said inclined surface to said opening, whereby as a result of said transverse bends said uppermost strip is given increased rigidity, is separated from the remaining strips and can be ejected from said housing by a push from said actuating member.

8. A device as recited in claim 7 in which said actuating member includes an element connected to said first portion of said actuating member, and in which said housing includes guide means cooperating with said element for guiding said actuating member through said stroke.

9. A device as recited in claim 8 in which said element connected to said first portion of said actuating member includes a duality of flanges depending from said first portion of said actuating member on opposite sides thereof, and in which said guide means includes a duality of longitudinally extending elongated slots, each of which receives one of said flanges for thereby guiding said actuating member through said stroke.

10. A dispenser for strip material comprising an elongated housing adapted to receive a plurality of superimposed flexible strips, an actuating member at one side of said housing, said actuating member having an element movable toward the opposite side of said housing for engaging the adjacent one of said superimposed strips, and simultaneously movable toward one end of said housing for moving said adjacent strip therewith toward said one end, said opposite side of said housing having spaced support means for said superimposed strips for supporting said strips at the side edges thereof, said element of said actuating member being intermediate said support means, whereby when said element engages said adjacent strip said strips are deflected intermediate the side edges thereof and given a transverse curvature in one direction, said housing having a transverse opening at said one end, and guide means at said one end for directing said adjacent strip to said opening for ejection therethrough and imparting a transverse curvature to said adjacent strip in the opposite direction.

11. A device as recited in claim 10 in which said transverse opening is adjacent said one side of said housing, said guide means including a wall inclined from said opposite side to said opening, and means at said opening defining a transversely arcuate path for said adjacent strip.

12. A device as recited in claim 11 in which said inclined wall is convexly arcuate.

References Cited by the Examiner

UNITED STATES PATENTS 2,696,293 12/1954 Testi _____ 221—63
3,133,672 5/1964 Thomasma et al. ____ 221—41 X SAMUEL F. COLEMAN, *Primary Examiner.*